UNITED STATES PATENT OFFICE.

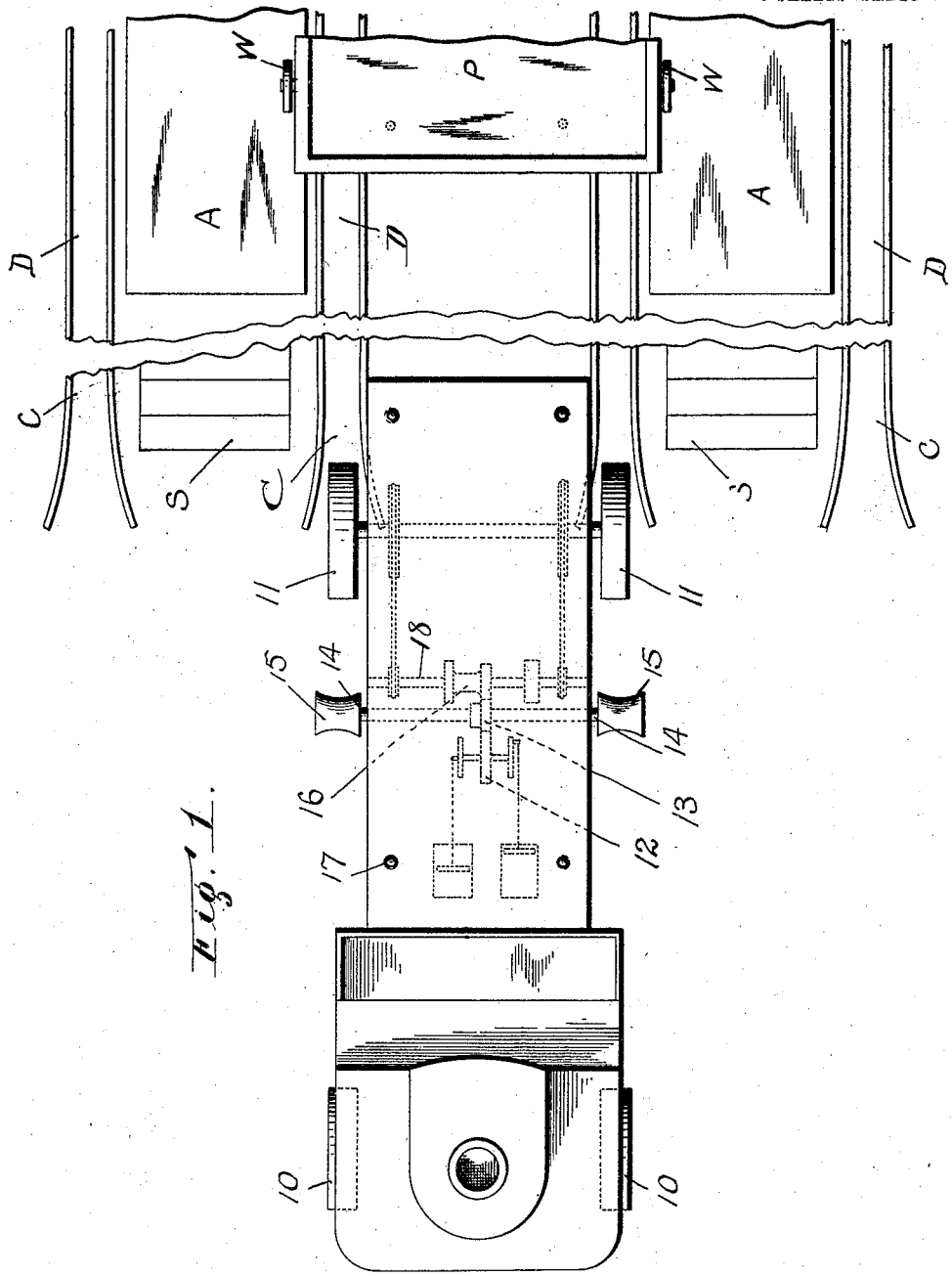

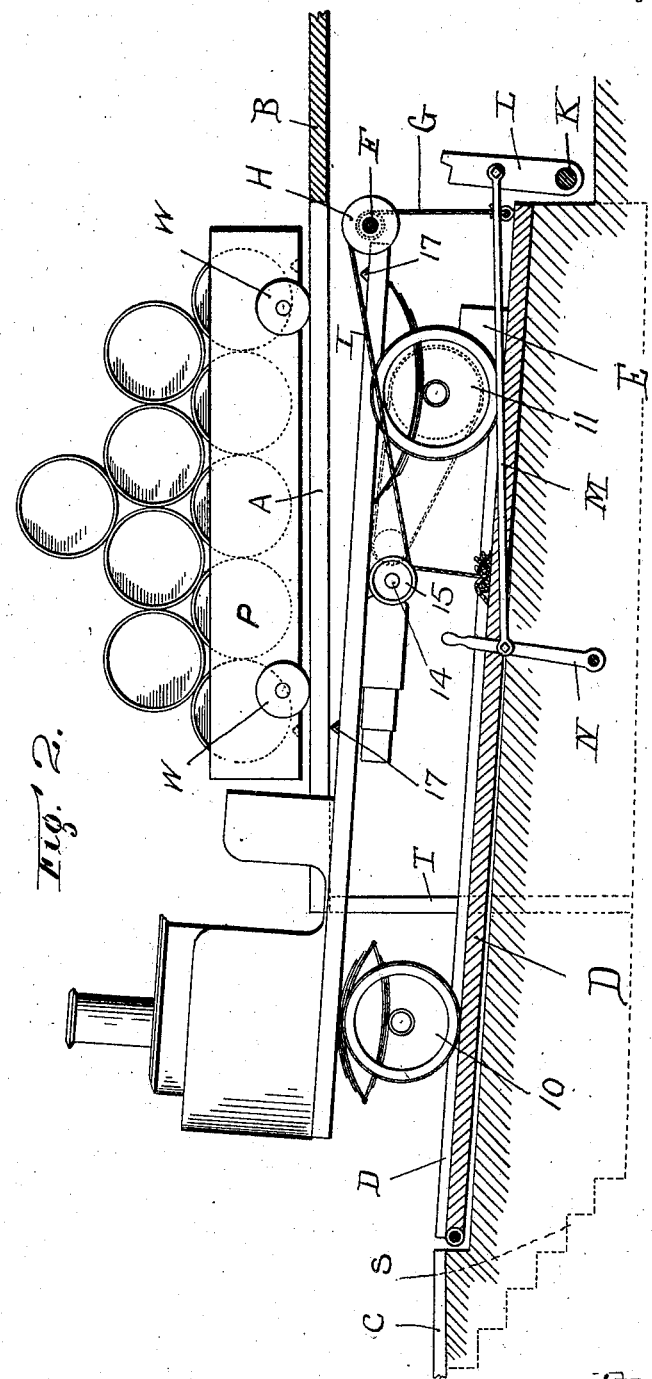

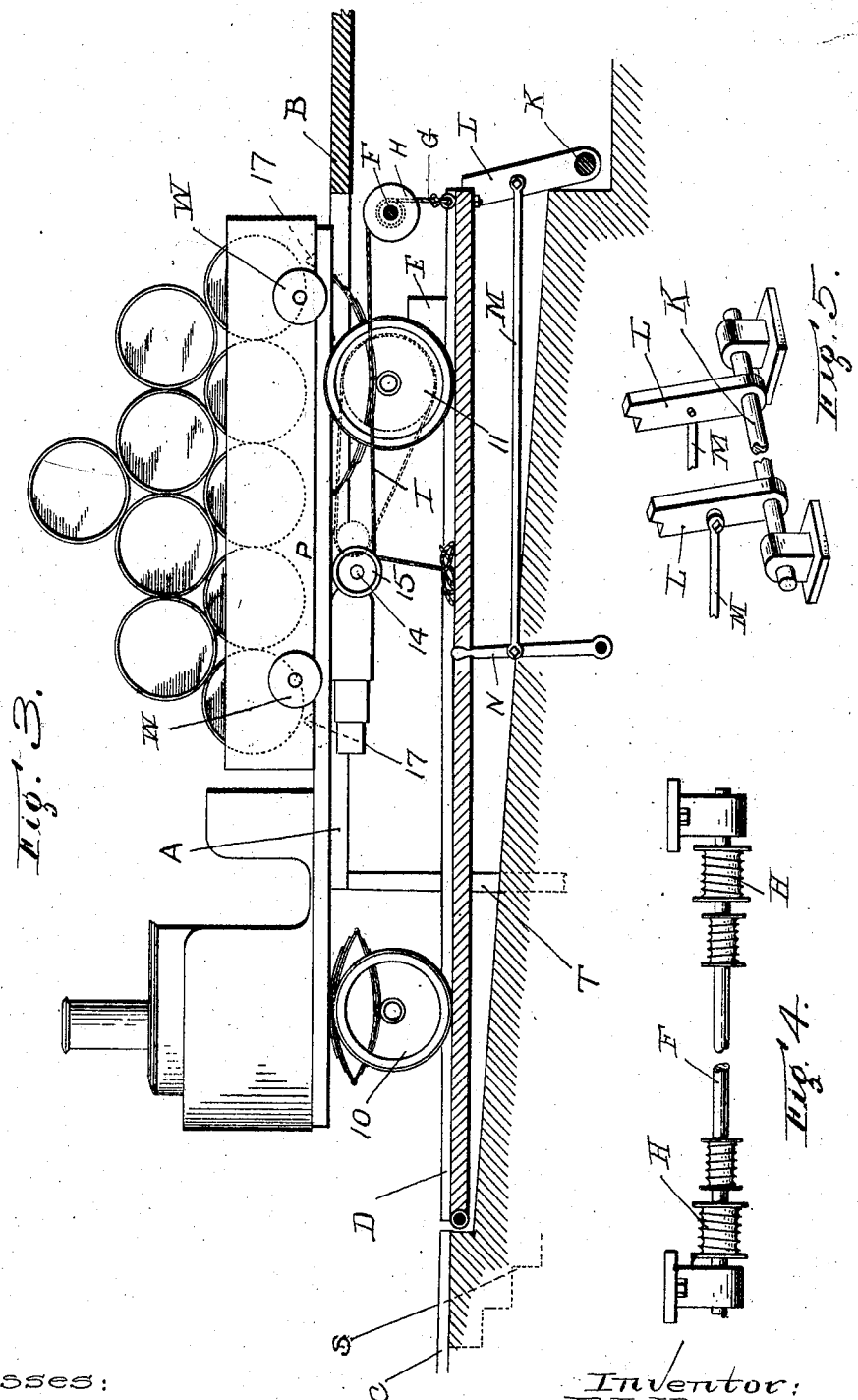

RALPH L. MORGAN, OF WORCESTER, MASSACHUSETTS.

MOTOR-TRUCK AND MEANS FOR LOADING AND UNLOADING THE SAME.

No. 800,165.            Specification of Letters Patent.            Patented Sept. 26, 1905.

Application filed January 18, 1902. Renewed February 25, 1905. Serial No. 247,243.

*To all whom it may concern:*

Be it known that I, RALPH L. MORGAN, a citizen of the United States, residing at Worcester, in the county of Worcester and State of Massachusetts, have invented a new and useful Motor-Truck and Means for Loading and Unloading the Same, of which the following is a specification.

This invention relates to that class of power-driven vehicles or trucks which are employed for ordinary trucking or freight-handling purposes.

The especial object of this invention is to provide an apparatus for loading and unloading motor-trucks which is especially designed to be operated by power furnished by the truck itself.

A further object of this invention is to provide an improved motor-truck which is provided with one or more capstans for operating the loading and unloading mechanism or for use for other purposes and which is provided with uncoupling connections between its driving-gear and motor, so that its motor may turn the capstans while the truck is standing still.

To these ends this invention consists of the apparatus for loading and unloading trucks, of the improved motor-truck, and of the combinations of parts therein, as hereinafter described, and more particularly pointed out in the claims at the end of this specification.

In the accompanying three sheets of drawings, Figure 1 is a plan view, partially broken away, of an apparatus for loading and unloading trucks constructed according to this invention, showing a motor-truck backing into position to be loaded. Fig. 2 is a side view, partially in section, showing a motor-truck after it has been run into position beneath a crate or body portion, the operator's pit and stairs leading thereto being indicated in dotted lines. Fig. 3 is a similar view showing the truck lifted up to pick up its crate or body portion. Fig. 4 is a detail view of the apparatus for lifting the pivoted tracks, and Fig. 5 is a detail perspective view of the locking-pieces for holding the pivoted tracks in their raised positions.

In hauling nearly all classes of freight the loading and unloading of the trucks has heretofore been done by hand. This practice is especially objectionable for the loading and unloading of motor-trucks on account of the time during which the truck is required to remain stationary, the large cost of a motor-truck and the expense of skilled engineering help running the same requiring that for economical operation the truck should be kept running for as much of the time as possible.

The especial object of my present invention is therefore to provide an apparatus for loading and unloading motor-trucks which will permit a truck to be loaded or unloaded without the waste of time which has heretofore been required when these operations are performed by hand.

A further object of my invention is to provide a motor-truck with power-driven capstans which may be driven from the truck-motor without turning the wheels and to construct a loading and unloading apparatus so that the same may be operated by power furnished from the truck itself.

To accomplish these results, an apparatus constructed according to this invention consists of the combination of a motor-truck, a motor or engine for operating the truck, and loading and unloading devices arranged to be operated from said motor.

The specific loading and unloading apparatus which I have herein illustrated comprises means for supporting the sides of a crate or body so that a truck may be run into place beneath the same and means for lifting the truck to pick up the crate or for lowering the truck to unload the same. The elevating connections for raising and lowering the truck to pick up its crate or to unload the same are preferably operated by power furnished by the truck itself, and I consider this to be a characteristic feature of my invention, because by utilizing each truck to furnish its own power for loading or unloading the same I am not required to maintain a power plant at each station equipped according to my invention, as I should be required to do did I not employ power from the trucks themselves for this purpose, and although in this application for patent I have illustrated elevating connections for raising and lowering the truck itself to load and unload the same I do not wish to be limited to that particular way of effecting the loading and unloading, as other constructions operated by power furnished from the truck itself may be readily devised to produce the desired relative motion between the crate and the truck in some other way than that herein illustrated.

Referring to the accompanying drawings for a detail description of one form of apparatus for practicing my invention, A designates the piers or frames for supporting the sides of a crate or body portion, which frames A extend out from a platform B. Between the frames A are slips or stalls which are wide enough to receive a motor-truck, and leading to the stalls are fixed ways or tracks D. As shown most clearly in Figs. 2 and 3, the bottoms of the slips or stalls are inclined, and pivotally mounted in the slips or stalls are tracks D, which are provided with bumpers or stops E for stopping a truck in accurate position when the same is backed in onto the tracks D.

The platforms or frames A are supported on posts or uprights T, and leading down below each of the platforms A, as indicated by dotted lines in Fig. 2, are steps S. The space below each platform A constitutes, in effect, an operating-pit, in which the operator stands while controlling the elevating devices for raising the truck to cause the same to pick up its crate or body portion.

As herein illustrated, the elevating devices comprise a cross-shaft F, having hoisting-drums thereon, which are connected by ropes G to the pivoted tracks D. The cross-shaft F is journaled near its ends in hangers, as shown in Fig. 4. These hangers are omitted in Figs. 2 and 3 for the sake of clearness. Secured on the ends of the cross-shaft F are winding-drums H, having ropes or cords I wound thereon and adapted to be connected to a capstan-head on the truck.

Coöperating with the pivoted tracks D is a locking or supporting mechanism comprising a shaft K, carrying locking-arms L, which may be operated from a lever N through a link M. The locking devices are intended to support the pivoted tracks in their raised position, so that when a truck has picked up its load the connection from the capstan of the truck can be released and the truck permitted to move off. When the tracks are locked in their raised position and a loaded truck has been backed into place and it is desired to unload the truck, one or two turns of the rope G may be carried around the capstan. The motor-engine may then be started to lift the tracks slightly above their locked position. The engine may then be stopped, the locking devices drawn back, and the rope slacked off by hand from the capstan to lower the tracks to their unlocked or normal position. The hoisting by the capstan may be controlled by tightening up the free end of the rope in the same manner that ordinary capstans are employed—that is to say, by pulling on the free end of the rope the turns upon the capstan will be tightened and the lifting of the tracks will take place, while by letting up on the free end of the rope the rope will be slacked off from the capstan and the tracks will be lowered. This lowering may be done, if desired, while the capstan is still turning.

The form of truck which I preferably employ is most clearly illustrated in Fig. 1. As shown in this figure, the truck comprises a body portion or platform mounted to run on front wheels 10 and rear wheels 11. The operating connections for the truck are located below its platform, and, as shown in dotted lines, the operating connections comprise a double-cylinder engine having a driving-gear 12 on its main shaft. Meshing with and driven from the gear 12 is a double gear 13, which is secured on a cross-shaft 14, having a capstan-head 15 at each end thereof. Coöperating with the double gear 13 is a shifting gear 16, which is mounted on a shaft 18, which is connected by one or more driving-chains to operate the rear axle of the truck. The shifting gear 16 has sections, one of which meshes with the larger part of the double gear 13 when the shifting gear 16 is in one position and a larger section, which meshes with the smaller section of the double gear 13 when the shifting gear occupies its extreme position in the other direction. When the shifting gear occupies a central position, the same will be out of mesh with the double gear 13, and the engine may be run to drive the capstans 15 without turning the rear wheels, and I consider this a feature of importance, as the same not only enables me to utilize the capstans 15 for operating the loading and unloading apparatus, but it also enables me to utilize the capstans 15 for other purposes as well. For example, in running over soft or muddy highways if the truck becomes stuck or breaks through, so that its running-gear is not powerful enough to extricate the same, the running-gear may be thrown out of mesh and ropes may be run from the capstans 15 to posts, trees, or other fixed objects to pull the truck out of the mire. Extending up from the platform of the truck are centering pins or cones 17, and, as shown most clearly in Figs. 1 and 2, the centering pins or cones 17 are adapted to engage sockets in the bottom of the crate or body portion P. The crate or body portion P may be provided with wheels or casters W to permit the same to be more readily rolled into position to be loaded onto or unloaded from a truck.

By means of this construction it will be seen that I have provided an apparatus for loading and unloading motor-trucks which will save practically all the time which has heretofore been wasted in loading and unloading motor-trucks by hand, so that by the use of this apparatus motor-trucks may be kept on the road and in actual operation substantially the entire time.

I am aware that changes may be made in practicing my invention by those who are skilled in the art without departing from the scope thereof as expressed in the claims. I do not wish, therefore, to be limited to the construction I have herein shown and described; but What I do claim, and desire to secure by Letters Patent of the United States, is—

1. In an apparatus of the class described, the combination of a truck, a motor or engine for operating the same, loading and unloading fixtures mounted in position so that the truck may be run into place to coöperate therewith, and means for operating the loading and unloading devices from said motor or engine.

2. In an apparatus for loading or unloading trucks, the combination of means for supporting the sides of a crate or body, so that a truck may be run into place beneath the same, and means controlled by power from said truck for lifting the truck to pick up the crate, and for lowering the truck to unload the same.

3. In an apparatus for loading or unloading trucks, the combination of means for supporting the sides of a crate or body, tracks located between said supports in position so that a truck may be run into place beneath a crate or body, and means controlled by power from said truck for raising the tracks to lift the truck and pick up the crate, or for lowering the tracks to unload the truck.

4. In an apparatus for loading or unloading trucks, the combination of means for supporting the sides of a crate or body, inclined tracks pivoted at their front ends, and located in position so that a truck may be run thereon into place beneath a crate, and means for raising the rear ends of said tracks to lift the truck and pick up a crate, or for lowering the tracks to unload the truck.

5. In an apparatus for loading or unloading trucks, the combination of means for supporting the sides of a crate or body, inclined tracks pivoted at their front ends in position so that a truck may be run thereon into place beneath the crate or body, means controlled by power furnished from a truck for raising the rear ends of the tracks to lift the truck and pick up a crate, and a lock for supporting the tracks in their lifted position.

6. In an apparatus for loading or unloading trucks, the combination of means for supporting the sides of a crate or body, inclined tracks pivoted at one end, and located between the supports, so that a truck may be run thereon into place beneath a crate or body, and a lifting mechanism for said tracks comprising a shaft having lifting-drums connected by cords to the rear ends of the tracks, and a winding-drum having a cord adapted to be wound on a capstan of a truck standing on the tracks, and a lock for supporting the tracks in their raised position.

In testimony whereof I have hereunto set my hand in the presence of two subscribing witnesses.

RALPH L. MORGAN.

Witnesses:
PHILIP W. SOUTHGATE,
JOHN F. CROWELL.